United States Patent Office 3,539,509
Patented Nov. 10, 1970

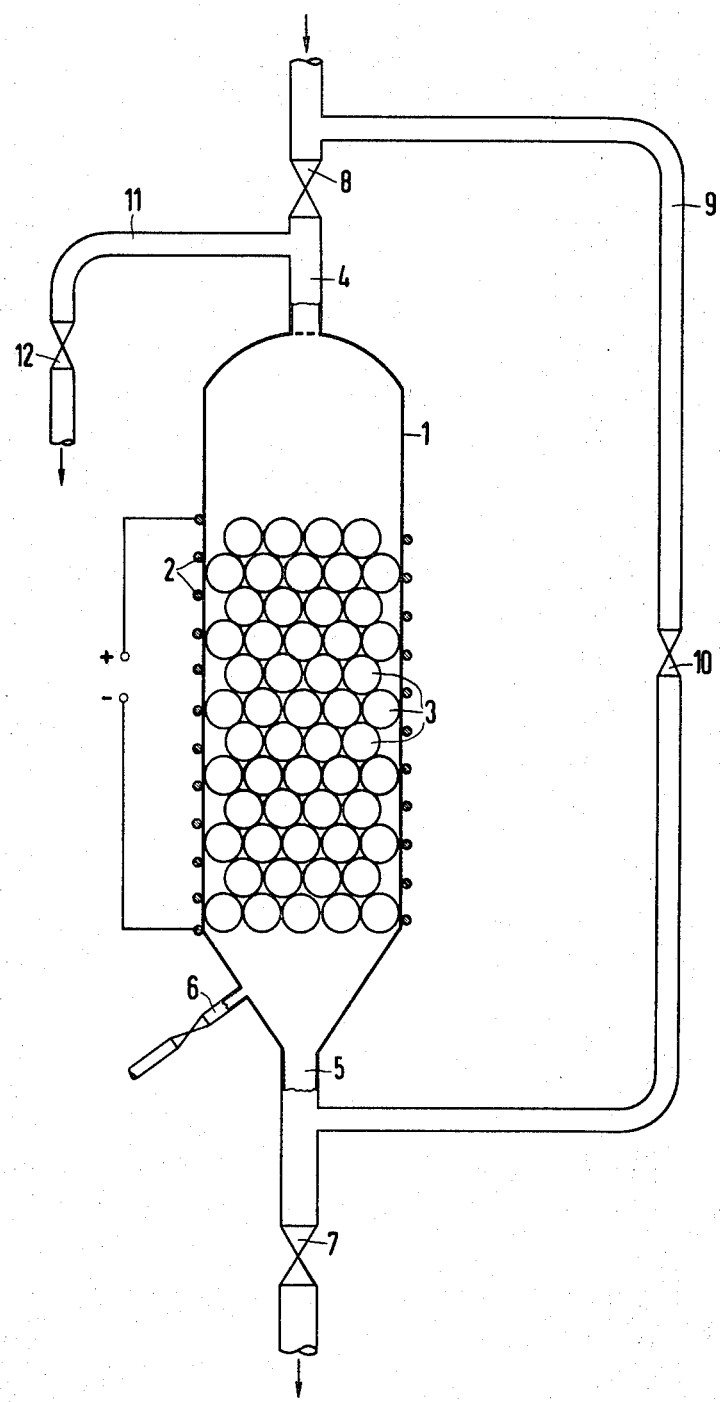

3,539,509
METHOD FOR ELECTROMAGNETIC REMOVAL OF IRON-OXIDES FROM LIQUIDS
Hans-Günter Heitmann, Erlangen-Buckenhof, and Gerhard Donath and Werner Beyer, Erlangen, Germany, assignors to Siemens Aktiengesellschaft, Munich, Germany, a corporation of Germany
Filed Apr. 30, 1968, Ser. No. 725,428
Claims priority, application Germany, June 8, 1967, S 110,237
Int. Cl. B01d 35/06
U.S. Cl. 210—42                                  2 Claims

ABSTRACT OF THE DISCLOSURE

The method of removal of iron-oxide from liquids, which comprises applying an electrically produced magnetic field to a filter bed. This filter bed is comprised of magnetizable particles, preferably iron balls. Following accumulation of the oxide on the particles, the magnetic field is disconnected and a rinsing fluid is passed through the filter.

---

The installation parts and the pipe lines of industrial plants, particularly steam power plants are primarily comprised of ferrite steel. As a result the water, usually employed therein as a production material, always contains traces of iron oxide. In steam power plants and in oxygen-free cycles, said iron oxides are overwhelmingly comprised of ferromagnetic $Fe_3O_4$ or of $\gamma\text{-}Fe_2O_3$ formed thereon. These oxides may lead to localized deposits and to operational disturbances in steam generators and steam turbines. Thus, the elimination of iron oxide from the feed water is of great technical and economical importance.

Numerous mechanical and magnetic methods have become devised for elimination of these iron oxides. The use of permanent magnets encounters the fact that purification of the magnets is often intricate and expensive. Furthermore, it is difficult to produce a magnetic force field in a flow-through system, which would cause all undissolved particles to precipitate. The same difficulties occur when an electrically produced magnetic field is applied, since the outside application of magnetic poles to the flow system to be purified, generally results, within the flow-through system, in a field intensity too low to transport the iron-oxide particles to the pipe wall.

Hence, it is an object of our invention to devise an electromagnetic precipitation method therefor which would ensure a reliable precipitation of the iron oxides.

To this end and in accordance with the present invention, we apply an electrically produced magnetic field to a filter bed of magnetizable particles which is passed by the contaminated liquid. Following the saturation of the filter bed, the iron oxides, accumulated at the magnetized particles, are removed by disconnecting the magnetic field and draining the liquid and/or by passing a rinsing fluid through the filter.

The drawing schematically shows the filter of our invention.

A device for carrying out the method of our invention consists of a cylindrical filter chamber surrounded by an electric coil. The filter chamber is filled with magnetizable particles and is equipped at its ends with inlet and outlet pipes for the liquid to be purified and for the rinsing or flushing fluid. The magnetizable particles may be soft iron balls and may, if necessary, be equipped with a rust protective layer. The filter container is of non-magnetic material.

The filling of the filter bed with magnetizable particles produces, during the application of the magnetic field, high field intensity gradients in the spaces between the particles, which are randomly filled into the filter bed, so that the ferromagnetic particles, contained in the water, are transported to the magnetic poles of said particles and adhere thereto. To purify the system the magnetic field is shut off and the filter is traversed by a rinsing fluid, preferably countercurrent to the direction of passage of the liquid to be purified. A gas may be blown through the filter bed, concomitantly with the rinsing fluid.

To improve the rinsing off of the iron-oxide particles from the particles, a slight counter voltage or a decaying alternating field should be applied, in order to cancel the magnetic remanence.

A schematic drawing will also be used to illustrate the construction and operation in an embodiment example.

A cylindrical filter container 1 is filled with a filter bed of soft-iron balls 3 to the required height. The filter container 1, across the region of the soft-iron balls 3, is surrounded by an electrical coil 2 which produces the required magnetic field. The filter container 1 has an inlet pipe 4 at its upper end for the liquid to be purified, and a drain-off pipe at its lower end for the purified liquid. In addition, the lower end is equipped with a feed pipe 6, for supplying a rinsing gas.

When the filter container 1 is filled with the soft-iron balls 3, voltage is applied to coil 2, so that a magnetic field develops within the filter bed, valves 8 and 7 are opened and liquid, contaminated with iron oxide, begins to flow through the filter bed 3. Due to the high field strength gradients in the spaces of the randomly stacked particles in the filter bed, the iron-oxide particles accumulate on the soft-iron balls 3. When the absorptive properties of the filter bed are exhausted, as can be determined through a measuring of the liquid leaving the filter bed, but not described in detail, the current traversing coil 2 is cut off and the valves 7 and 8 are closed. Valves 10 and 12 are now opened and the filter bed is flooded from below, by the purifying liquid, via the bypass line 9 and valve 10. To increase the rinsing effect, a rinsing gas can be additionally supplied via the auxiliary nozzle 6. The purifying liquid rinses away the iron-oxide particles deposited on the soft-iron balls 3 and transports them via discharge nozzle 11 and the discharge valve 12 into a receiving container, not shown. To accelerate the rinsing off process, an opposite voltage or a decaying alternating field may be applied to the coil, in order to cancel the magnetic remanence which remains at the soft-iron balls 3, due to the previous magnetization.

Using our above-described method and device, it becomes possible, in a simple manner, to remove ferromagnetic iron-oxide particles, contained and finely distributed in any liquid, to completely eliminate contamination or damage of installation parts from ferromagnetic iron-oxide particles. For instance when using a magnetic field intensity of approximately 40,000 a./m., about 92 to 95% of the iron oxide contained in the water was precipitated.

We claim:
1. The method for electromagnetic removal of iron oxides from liquids, particularly from the feed water of steam power plants, which comprises applying an electrically produced magnetic field to a filter bed of loose magnetizable particles through which the contaminated liquid passes and upon saturation of the filter bed, removing the iron oxides, accumulated at the magnetized particles by disconnecting the magnetic field and flushing the filter bed by passing a rinsing fluid together with a gas flow countercurrently through the filter to the direction of passage of the contaminated fluid, while ap- plying a slight counter voltage to the filter bed during the flushing.

2. The method for electromagnetic removal of iron oxides from liquids, particularly from the feed water of steam power plants, which comprises applying an electrically produced magnetic field to a filter bed of loose magnetizable particles through which the contaminated liquid passes and upon saturation of the filter bed, removing the iron oxides, accumulated at the magnetized particles by disconnecting the magnetic field and flushing the filter bed by passing a rinsing fluid together with a gas flow countercurrently through the filter to the direction of passage of the contaminated fluid, while applying a decaying alternating field to the filter bed during the flushing.

References Cited

UNITED STATES PATENTS

| | | | |
|---|---|---|---|
| 2,385,431 | 9/1945 | Vose | 210—223 X |
| 2,398,725 | 4/1946 | Schutte | 210—223 X |
| 2,559,784 | 7/1951 | Moore | 210—275 X |
| 2,943,739 | 7/1960 | Maynard | 210—223 |

SAMIH N. ZAHARNA, Primary Examiner

U.S. Cl. X.R.

210—222, 274, 275